United States Patent
Darcy (10) Patent No.: US 9,210,219 B2
(45) Date of Patent: Dec. 8, 2015

(54) SYSTEMS AND METHODS FOR CONSISTENT HASHING USING MULTIPLE HASH RINGS

(71) Applicant: Red Hat, Inc., Raleigh, NC (US)

(72) Inventor: Jeff Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 329 days.

(21) Appl. No.: 13/941,597

(22) Filed: Jul. 15, 2013

(65) Prior Publication Data

US 2015/0019680 A1    Jan. 15, 2015

(51) Int. Cl.
*H04L 29/08* (2006.01)
*H04L 12/819* (2013.01)

(52) U.S. Cl.
CPC .......... *H04L 67/1097* (2013.01); *H04L 47/215* (2013.01); *H04L 67/1023* (2013.01)

(58) Field of Classification Search
CPC ..................................................... H04L 47/215
See application file for complete search history.

(56) References Cited

U.S. PATENT DOCUMENTS

| | | | | |
|---|---|---|---|---|
| 4,567,590 A * | 1/1986 | Bederman | | 370/452 |
| 5,001,472 A * | 3/1991 | Fischer et al. | | 370/455 |
| 5,566,177 A * | 10/1996 | Bhandari et al. | | 370/452 |
| 6,580,712 B1 * | 6/2003 | Jennings et al. | | 370/392 |
| 7,293,041 B2 * | 11/2007 | Such | | 1/1 |
| 7,738,466 B2 | 6/2010 | Schwan | | |
| 7,876,698 B2 | 1/2011 | Sienel | | |
| 7,975,074 B2 * | 7/2011 | Cheng et al. | | 709/251 |
| 8,126,849 B2 | 2/2012 | Schwan | | |
| 8,244,846 B2 | 8/2012 | Wong | | |
| 2003/0002677 A1 * | 1/2003 | Dagan et al. | | 380/265 |
| 2003/0061389 A1 * | 3/2003 | Mazza | | 709/248 |
| 2005/0237948 A1 * | 10/2005 | Wan et al. | | 370/254 |
| 2009/0323696 A1 | 12/2009 | Schwan | | |
| 2010/0039931 A1 * | 2/2010 | Shi et al. | | 370/216 |
| 2010/0228848 A1 | 9/2010 | Kis | | |
| 2012/0078915 A1 | 3/2012 | Darcy | | |
| 2012/0110057 A1 | 5/2012 | Hautakorpi | | |
| 2012/0300676 A1 | 11/2012 | Welin | | |
| 2013/0145099 A1 | 6/2013 | Liu | | |
| 2013/0223206 A1 * | 8/2013 | Dake | | 370/227 |

OTHER PUBLICATIONS

Darcy, Jeff. Multi-Ring Hashing. Jul. 16, 2012. http://hekafs.org/index.php/2012/07/multi-ring-hashing/.
Overton, Sam. Virtual Node Strategies. Oct. 7, 2012. http://acunu.com/2/post/2012/07/virtual-nodes-strategies.html.

* cited by examiner

*Primary Examiner* — Lashonda Jacobs
(74) *Attorney, Agent, or Firm* — Lowenstein Sandler LLP (57) ABSTRACT

Systems and methods for consistent hashing using multiple hash rings. An example method may comprise: assigning two or more tokens to each node of a plurality of nodes, the two or more tokens belonging to two or more distinct cyclic sequences of tokens, wherein each node is assigned a token within each cyclic sequence; receiving a request comprising an attribute of an object; determining, based on the attribute, a sequence identifier and an object position, the sequence identifier identifying a sequence of the two or more cyclic sequences of tokens, the object position identifying a position of the object within the sequence; and identifying, based on the sequence identifier and the object position, a node for servicing the request.

20 Claims, 6 Drawing Sheets

SYSTEMS AND METHODS FOR CONSISTENT HASHING USING MULTIPLE HASH RINGS

TECHNICAL FIELD

The present disclosure is generally related to computer systems, and is more specifically related to systems and methods for consistent hashing.

BACKGROUND

In a distributed computer system, data objects may be stored on a plurality of interconnected nodes in accordance with a storage architecture defining the data object placement and replication policies. The system efficiency and reliability may be significantly affected by the principles and design choices governing the storage architecture.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for consistent hashing using multiple hash rings. Consistent hashing methods may be employed for distributing data storage and/or retrieval requests over a plurality of nodes (e.g., over a plurality of servers in a storage cluster). A data storage or retrieval request may reference a data object, such as a file identified by a file name, or a memory page identified by a virtual or physical address.

The nodes may be logically arranged in a cyclic sequence also referred to as "ring," in which each node is assigned a token (e.g., represented by an integer value) defining the position of the node on the ring. By design, the largest token value on the ring is followed by the smallest token value. Each request referencing a data object may be assigned to a node by applying a pre-defined hash function to an attribute of the data object (e.g., the file name) to calculate the object position on the ring and then moving along the ring in a pre-determined direction (e.g., clockwise), until a node is found. Thus, each node becomes responsible for servicing requests for data objects located on the ring between the node itself and its predecessor node on the ring.

In some conventional systems, a replica of each data object is stored on a failover node, thus improving the overall system reliability. In an illustrative example, the failover node may be identified as the node following, in a pre-determined direction (e.g., clockwise) along the ring, the primary node storing the data object. Hence, if the primary node fails, its load will automatically fall onto the failover node. Thus, the load on the failover node can be effectively doubled, which may potentially lead to increasing request service time or even the failover node failure due to overloading.

Aspects of the present disclosure address the above noted deficiencies by employing multiple hash rings to distribute each node's load among several failover nodes. In certain implementations, the hash function applied to an attribute of the data object (e.g., the file name) may map the object to one of several pre-defined rings: in an illustrative example, certain bits of the hash function value may be interpreted as an identifier or a ring, while other bits may define the object position on the ring. Thus, each node may belong to a plurality of rings, having one token assigned to it in each of the rings to define the position of the node on the ring. Therefore, any given data object residing on the node may belong to any of those rings. Hence, a failover node for a data object will be defined based on the order of nodes within the ring to which the object has been mapped by the hash function, thus effectively distributing the failover load among all the surviving nodes.

Various aspects of the above referenced methods and systems are described in details herein below by way of examples, rather than by way of limitation.

Figure 1:
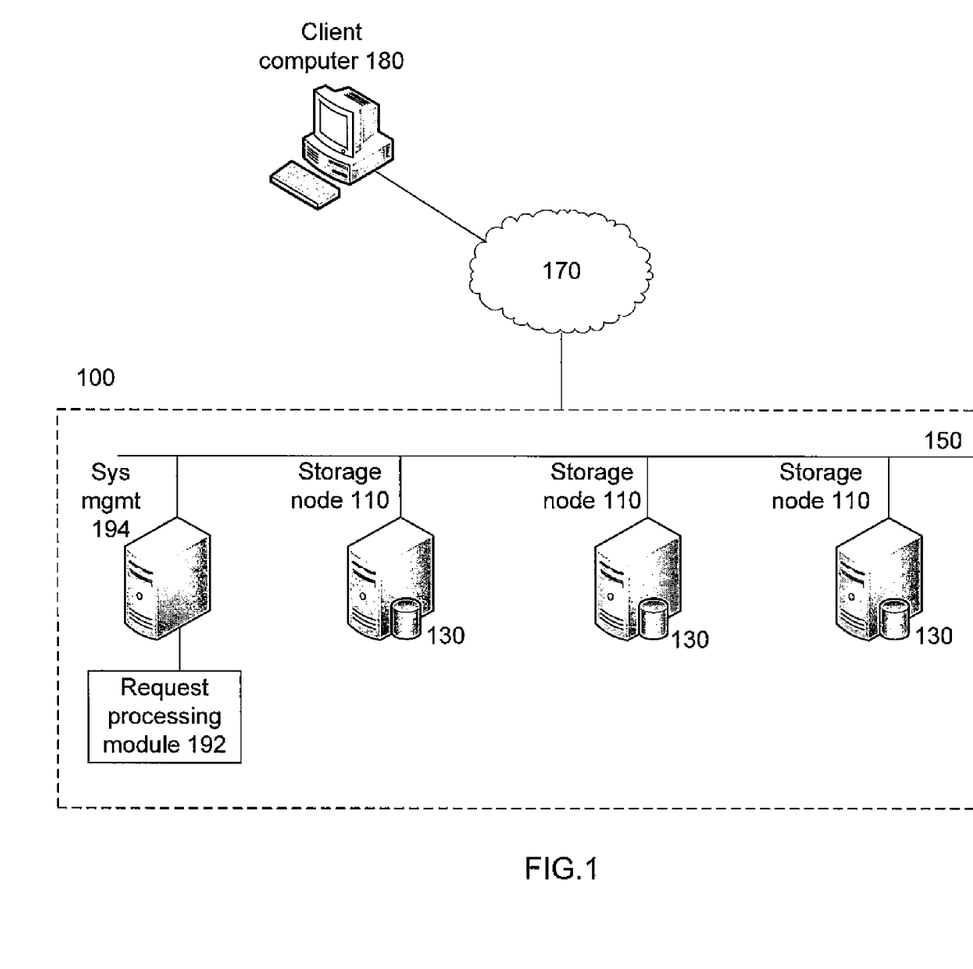
FIG. 1 schematically depicts component diagrams of example computer systems, in accordance with one or more aspects of the present disclosure.

FIG. 1 schematically depicts a high-level component diagram of an example computer system 100 in accordance with one or more aspects of the present disclosure. Computer system 100 may include one or more interconnected nodes 110. "Node" herein shall refer to an electronic device capable of servicing requests for data object handling (such as data object storage and/or retrieval requests). In an illustrative example of FIG. 1, each node 110 may include one or more data storage devices 130. "Data storage device" herein shall refer to a memory device, such as a disk, RAID array, EEPROM device, or any other device capable of storing data. Nodes 110 may be interconnected using a network 150.

In an illustrative example, computer system 100 may be communicatively coupled, e.g., over a network 170, to a client computer 180. Network 170 may be provided by one or more local area networks, one or more wide area networks, or any combination thereof. Client computer 180 may be provided by a computer system including a processor, a memory, and at least one communication interface (the above noted components of client computer 180 are omitted from FIG. 1).

Computer system 100 may be programmed to receive, from client computer 180 and/or other computer systems, requests for data object handling (such as data object storage and/or retrieval requests). In an illustrative example, a data object storage request may comprise a data object to be stored by computer system 100 (e.g., a file) and an attribute of the data object (e.g., a file identifier, such as a file name). Responsive to receiving the data object storage request, computer system 100 may apply a pre-defined hash function to the attribute of the data object, to identify a primary node and one or more failover nodes for storing the data object, as described in more details herein below. Upon storing the data object on the identified primary and failover nodes, computer system 100 may complete the request processing by transmitting to the requestor a response comprising the error code for the requested data object storage operation.

In another illustrative example, a data object retrieval request may comprise an attribute of a data object (e.g., a file identifier, such as a file name) to be retrieved from computer system 100. Responsive to receiving the data object retrieval request, computer system 100 may apply a pre-defined hash function to an attribute of the data object referenced by the request, to identify a primary or a failover node on which the data object is stored, as described in more details herein below. Upon retrieving the data object from the identified primary or failover nodes, computer system 100 may complete the request processing by transmitting to the requestor a response comprising the requested data object and/or the error code for the requested data object retrieval operation.

In certain implementations, the above described data object request processing functionality may be implemented by an object request processing module 192 running on a system management computer 194 communicatively coupled to the nodes 110 and programmed to route an incoming data object handling request to an appropriate node for processing. Alternatively, the object request processing module 192 may be running on one or more nodes 110, to process an incoming data object handling request locally or route to an appropriate peer node 110 for processing. In another example, the primary and/or failover nodes for servicing a data object request may be identified by the requestor, by applying a pre-defined hash function to an attribute of the data object referenced by the request. The requestor may then transmit the request directly to the identified nodes.

Figure 2:
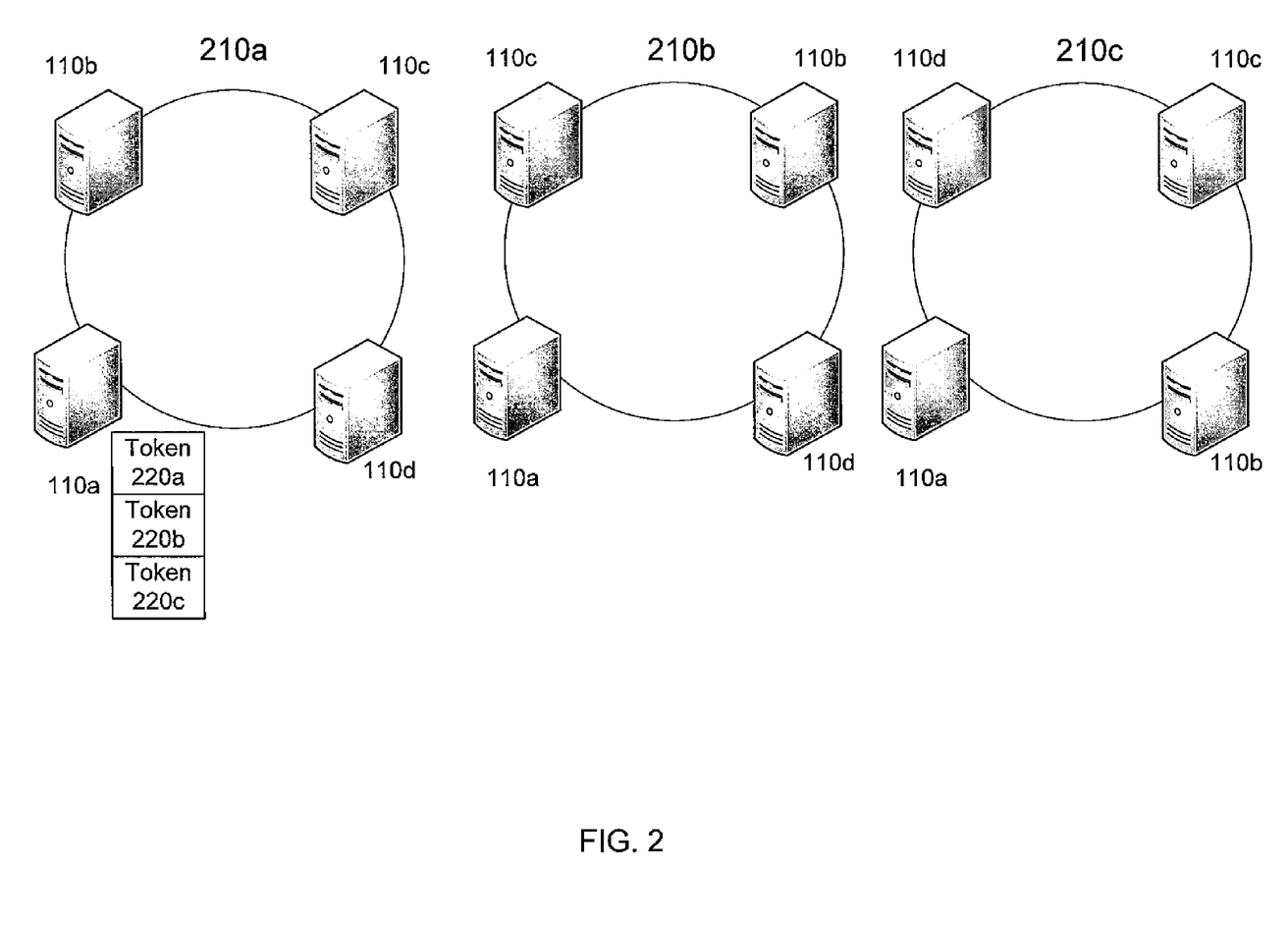
FIGS. 2-3 schematically illustrates consistent hashing using multiple rings, in accordance with one or more aspects of the present disclosure.

As noted herein above, nodes 110a-110k may be logically arranged in multiple rings 210a-210z, as schematically illustrated by FIG. 2. Each node may be associated with a plurality of rings, by having one token assigned to it in each of the rings to define the position of the node on the ring. As schematically illustrated by FIG. 1, node 110a may be assigned a plurality of tokens 220a-220c to define the node's position on each of the rings 210a-210c.

In one illustrative example, tokens may be represented by integer values. Alternatively, tokens may be represented by arbitrarily chosen values having an asymmetric transitive binary relation defined among them. By design, the "largest" token value on each of the rings is followed by the "smallest" token value, where the terms "largest" and "smallest" are defined according to the chosen binary relation.

Figure 3:
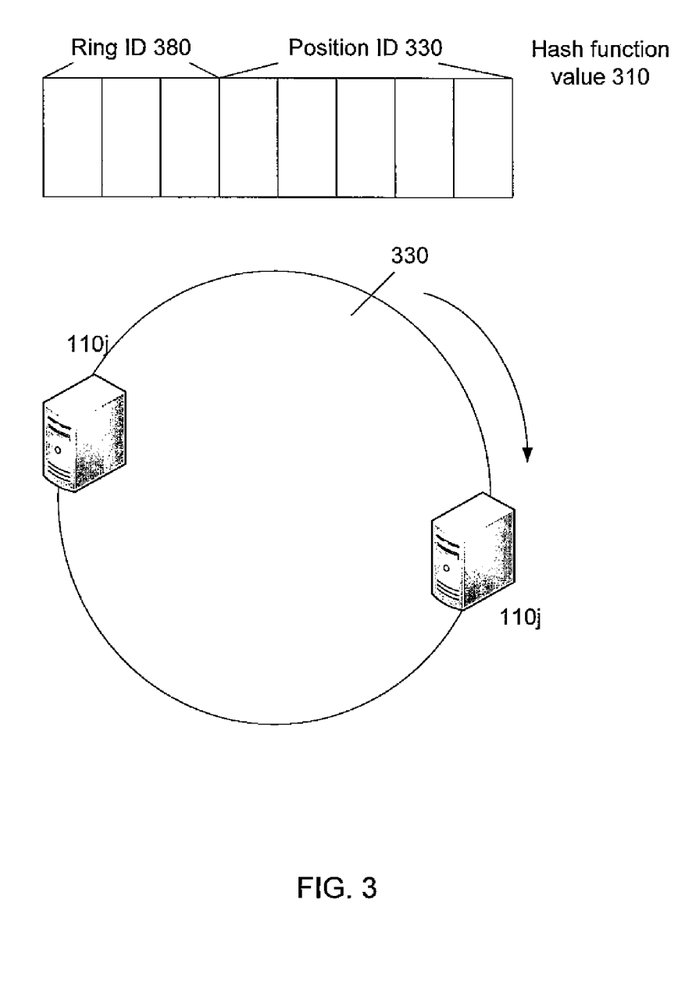

To identify the node responsible for servicing a given data object storage or retrieval request, a pre-defined hash function may be applied to an attribute of the data object (e.g., the file name) to determine the ring identifier and the data object position on the ring, as schematically illustrated by FIG. 3. In the illustrative example of FIG. 3, several most-significant bits of the hash function value 310 may be interpreted as a ring identifier 320. The number of rings N defined in the computer system 100 may be calculated as $N=2^k$, where k is the number of hash function value bits to be interpreted as a ring identifier. The remaining bits of a hash function value may be interpreted as an integer value 330 defining the data object position on the ring. The first node 110j following the object position 330 in a pre-determined direction along the ring (e.g., clockwise) may be designated as the primary node for servicing the data object storage or retrieval request. Thus, each node 110 may be responsible for servicing requests for data objects located on the ring between the node itself and its predecessor node on the ring. In the example of FIG. 3, node 110j may be responsible for servicing requests for data objects located on the ring between itself and the predecessor node 110i.

One or more replicas of each data object may be stored on one or more failover nodes. The number of replicas R to be stored by computer system 100 for each data object may also be referred to as the "replication level." In an illustrative example, one or more failover nodes for a given primary node may be identified as the nodes following, in a pre-determined direction (e.g., clockwise) along the ring, the primary node storing the data object. In certain implementations, for evenly distributing the load among all nodes, each node 110 may be positioned on the rings 210a-210z so that at least R−1 successors of the node on one ring would be different from at least R successors of the node on any other ring.

To perform the node positioning on the plurality of rings, a set of tokens may be assigned to the nodes to identify a "basic order" of nodes on a ring. In an illustrative example, to optimize the load distribution across nodes, the nodes may be evenly spaced along the ring, by employing a basic order of tokens in which each subsequent token exceeds the preceding token by the same value.

The first ring may be defined by assigning the tokens to the nodes according to the defined basic order. For each of the remaining N−1 rings, the sequence of nodes may be selected by following the basic order with a fixed stride, i.e., skipping a pre-determined, for each ring, number of nodes to select each subsequent node. A node that has already been assigned to the current ring may be replaced by a successor node according to the basic order. In certain implementations, the sequence of strides may be represented by a sequence of prime numbers. In one illustrative example, the smallest stride may be greater than the maximum replica count R. A plurality of tokens may be assigned to each node to reflect the node's position on each of the rings.

Figure 4:
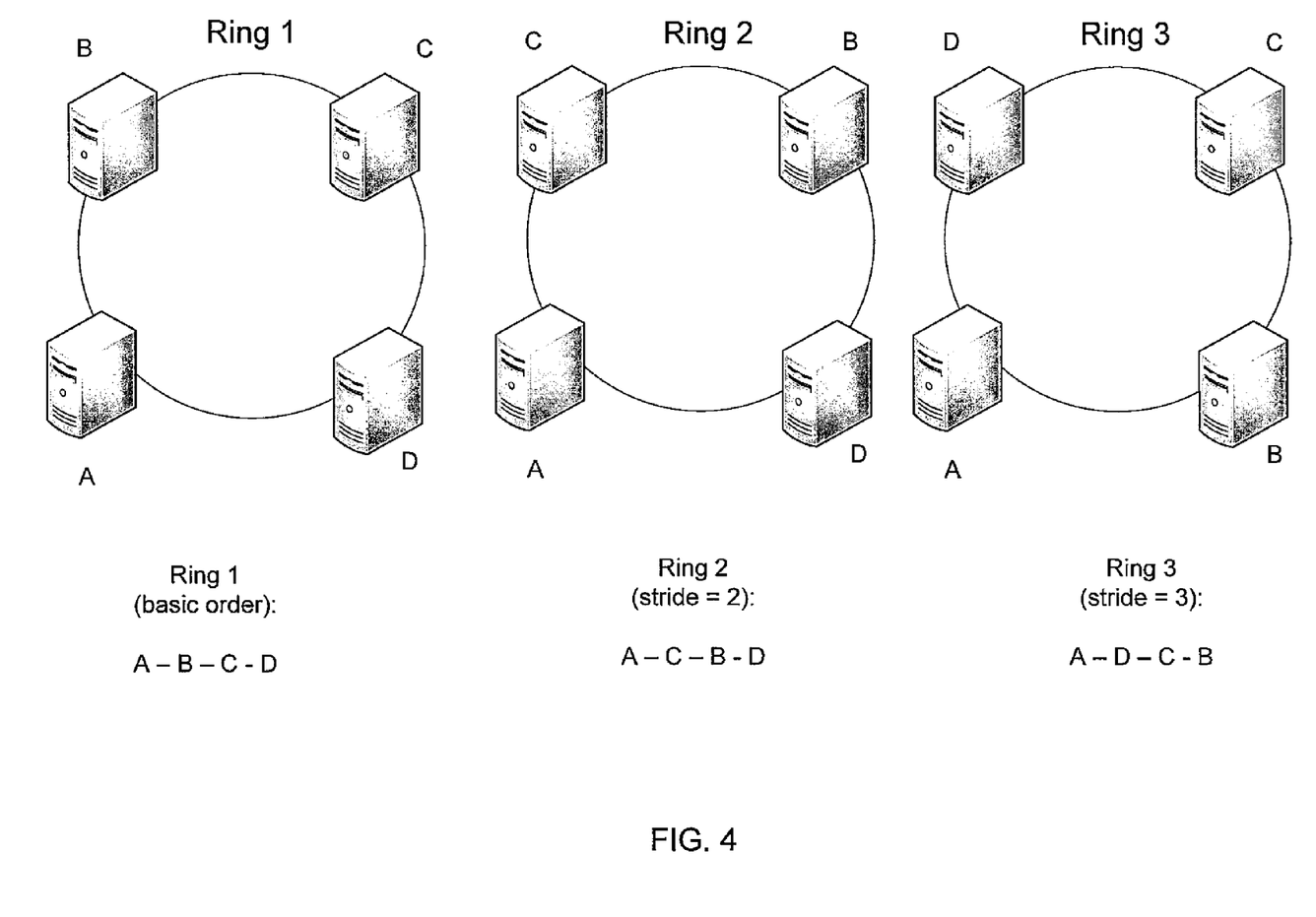
FIG. 4 schematically illustrates an example of assigning a plurality of nodes to multiple rings, in accordance with one or more aspects of the present disclosure.

FIG. 4 schematically illustrates an example of assigning a plurality of nodes A, B, C, and D to three rings in accordance with one or more aspects of the present disclosure. The basic order of nodes may arbitrarily be defined as A, B, C, D. The sequence of strides may be defined as 1, 2, 3.

For Ring 1, the tokens may be assigned to the nodes by following the basic order with the stride of 1, thus producing the following sequence of nodes: A, B, C, D. For Ring 2, the tokens may be assigned to the nodes by following the basic order with the stride value of 2 and skipping the nodes which have already been assigned to the ring, thus producing the following sequence of nodes: A, C, B, D. For Ring 3, the tokens may be assigned to the nodes by following the basic order with the stride value of 3 and skipping the nodes which have already been assigned to the ring, thus producing the following sequence of nodes: A, D, C, B. A plurality of tokens may be assigned to each node to reflect the node's position on each of the rings.

Figure 5:
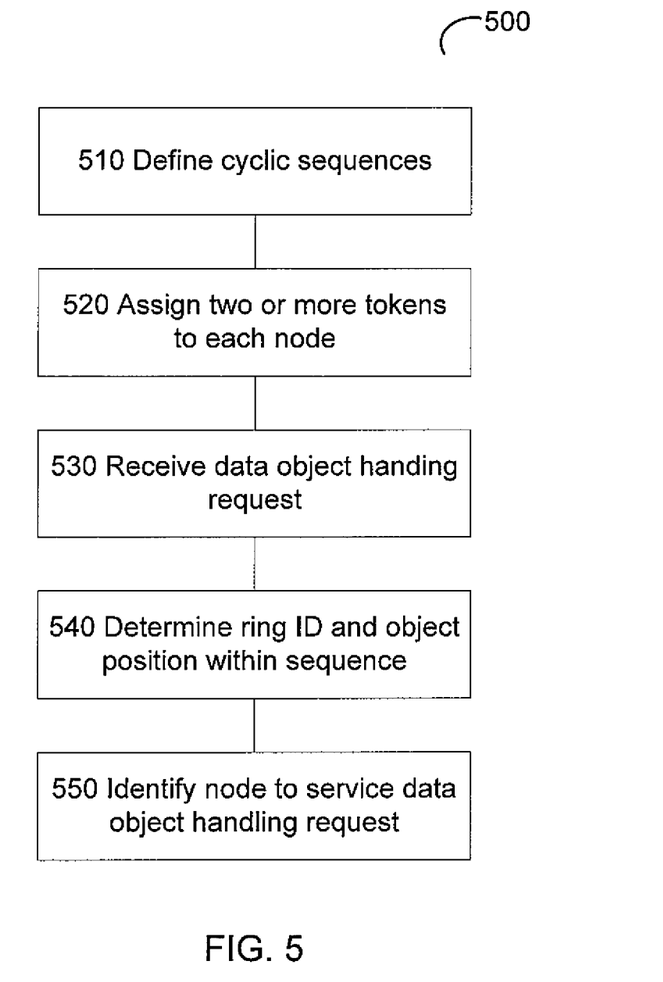
FIG. 5 depicts a flow diagram of an example method for consistent hashing using multiple hash rings, in accordance with one or more aspects of the present disclosure.

FIG. 5 depicts a flow diagram of an example method 500 for consistent hashing using multiple hash rings. The method 500 may be performed by a computer system (e.g., system management computer 194) that may comprise hardware (e.g., circuitry, dedicated logic, and/or programmable logic), software (e.g., instructions executable on a computer system to perform hardware simulation), or a combination thereof. The method 500 and/or each of its individual functions, routines, subroutines, or operations may be performed by one or more processors of the computer system executing the method.

At block 510, a computer system may define two or more cyclic sequences of a plurality of nodes configured to service data object handling requests (e.g., a plurality of servers in a storage cluster). The cyclic sequences may be defined to optimize the load distribution over the plurality of nodes, as described in more details herein above.

At block 520, the computer system may assign two or more tokens to each node of a plurality of nodes, in accordance with the previously defined cyclic sequences, to identify each node's position within each cyclic sequence. Each node may be associated with a plurality of rings, by having one token assigned to it in each of the rings to define the position of the node on the ring, as described in more details herein above. In one illustrative example, the tokens may be represented by integer values. Alternatively, the tokens may be represented by arbitrarily chosen values having an asymmetric transitive binary relation defined among them. By design, the "largest" token value within each of the cyclic sequences is followed by the "smallest" token value, where the terms "largest" and "smallest" are defined according to the chosen binary relation.

At block 530, the computer system may receive a data object handling request (e.g., a data object storage request or a data object retrieval request). The data object handling request may comprise an object attribute, such as a file name.

At block 540, the computer system may determine, based on the object attribute, a sequence identifier and an object position within the sequence. In certain implementations, the sequence identifier and the object position may be determined by applying a pre-determined hash function to the object attribute, as described in more details herein above.

At block 550, the computer system may identify, based on the sequence identifier and the object position, a node for servicing the request. A node having the smallest token value exceeding the identified object position value may be designated as the primary node for servicing the data object handling request. In certain implementations, one or more nodes following the identified primary node within one or more identified cyclic sequences may be designated as one or more secondary nodes for servicing the data object handling request, as described in more details herein above. Upon completing the operations referenced by block 550, the method may terminate.

Figure 6:
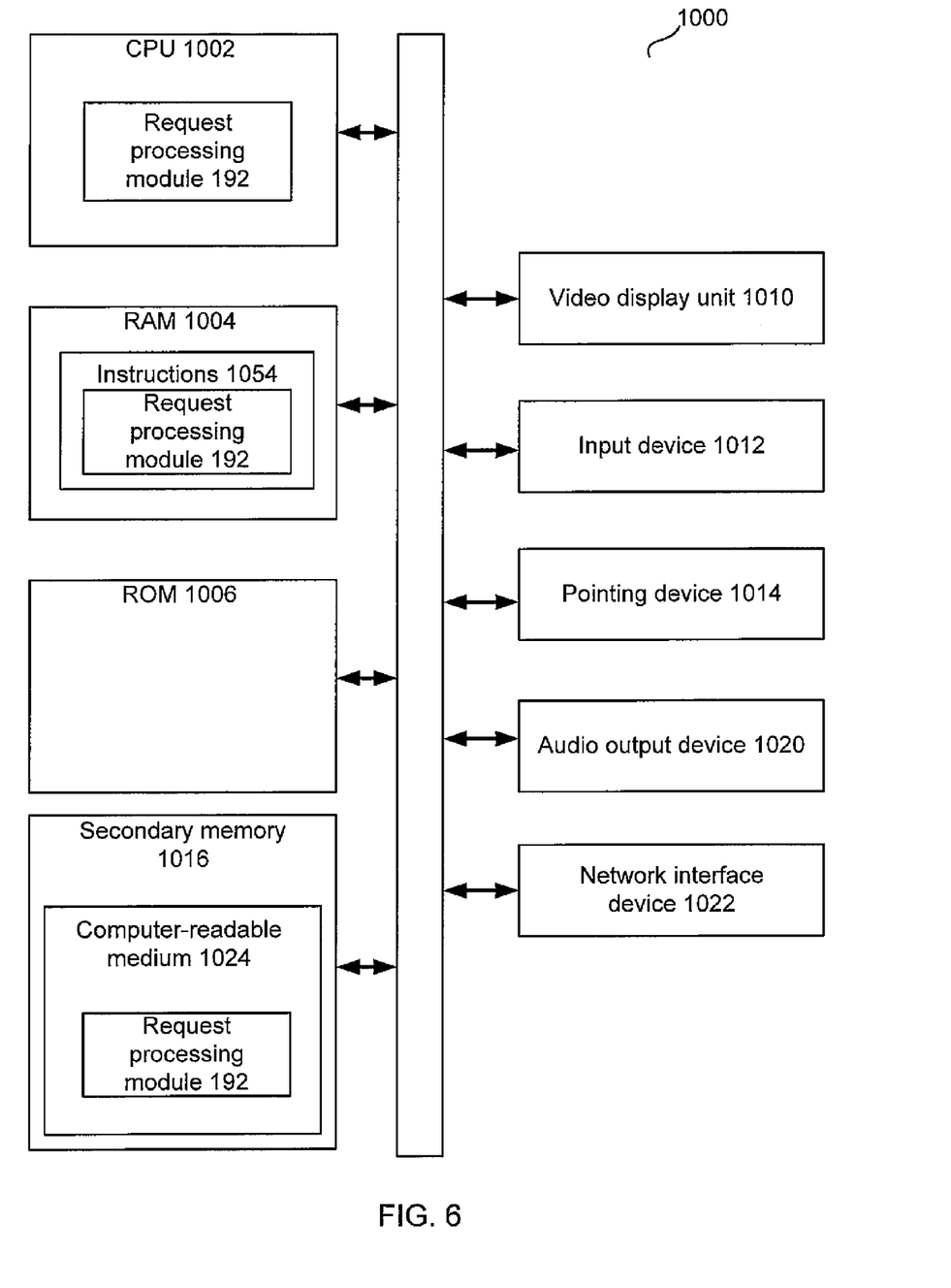
FIG. 6 depicts an illustrative computer system operating in accordance with in accordance with one or more aspects of the present disclosure.

FIG. 6 depicts an illustrative computer system operating in accordance with examples of the present disclosure. In one example, computer system 1000 may correspond to a node 110 of FIG. 1.

In one example, the computer system 1000 may be connected (e.g., via a network, such as a Local Area Network (LAN), an intranet, an extranet, or the Internet) to other computer systems (e.g., other nodes). Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

The processor 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further include a network interface device 1022. The computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a tangible computer-readable storage medium 1024 on which may be stored instructions 1054 encoding method 500 for consistent hashing using multiple hash rings. The instructions 1054 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform the method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. The method, comprising:
    assigning, by a processor, two or more tokens to each node of a plurality of nodes, the two or more tokens belonging to two or more distinct cyclic sequences of tokens, wherein each node is assigned one token within each cyclic sequence;
    receiving a request comprising an attribute of an object;
    determining, based on the attribute, a sequence identifier and an object position, the sequence identifier identifying a sequence of the two or more cyclic sequences of tokens, the object position identifying a position of the object within the sequence; and
    identifying, based on the sequence identifier and the object position, a node for servicing the request.

2. The method of claim 1, wherein identifying the node comprises calculating a hash function of the attribute.

3. The method of claim 1, wherein the request is provided by one of: an object storage request or an object retrieval request.

4. The method of claim 1, wherein the object is provided by one of: a file or a memory page.

5. The method of claim 1, wherein each node of the plurality of nodes is provided by a storage server.

6. The method of claim 1, wherein the attribute is provided by an identifier of the object.

7. The method of claim 1, further comprising one of: storing the object by the node identified for servicing the request or retrieving the object from the node identified for servicing the request.

8. The method of claim 1, further comprising identifying a failover node for servicing the request.

9. The method of claim 1, wherein the assigning further comprises following a basic order of nodes with a defined stride.

10. A system, comprising:
    a memory; and
    one or more processors, coupled to the memory, to:
        assign two or more tokens to each node of a plurality of nodes, the two or more tokens belonging to two or more distinct cyclic sequences of tokens, wherein each node is assigned one token within each cyclic sequence;
        receive a request comprising an attribute of an object;
        determine, based on the attribute, a sequence identifier and an object position, the sequence identifier identifying a sequence of the two or more cyclic sequences of tokens, the object position identifying a position of the object within the sequence; and
        identify, based on the sequence identifier and the object position, a node for servicing the request.

11. The system of claim 10, wherein identifying the node comprises calculating a hash function of the attribute.

12. The system of claim 10, wherein the request is provided by one of: an object storage request or an object retrieval request.

13. The system of claim 10, wherein the object is provided by one of: a file or a memory page.

14. The system of claim 10, wherein each node of the plurality of nodes is provided by a storage server.

15. A non-transitory computer-readable storage medium comprising executable instructions that, when executed by a computer system, cause the computer system to:
    assign, by a processor, two or more tokens to each node of a plurality of nodes, the two or more tokens belonging to two or more distinct cyclic sequences of tokens, wherein each node is assigned one token within each cyclic sequence;
    receive a request comprising an attribute of an object;
    determine, based on the attribute, a sequence identifier and an object position, the sequence identifier identifying a sequence of the two or more cyclic sequences of tokens, the object position identifying a position of the object within the sequence; and
    identify, based on the sequence identifier and the object position, a node for servicing the request.

16. The non-transitory computer-readable storage medium of claim 15, wherein identifying the node comprises calculating a hash function of the attribute.

17. The non-transitory computer-readable storage medium of claim 15, wherein the request is provided by one of: an object storage request or an object retrieval request.

18. The non-transitory computer-readable storage medium of claim 15, wherein the object is provided by one of: a file or a memory page.

19. The non-transitory computer-readable storage medium of claim 15, wherein the executable instructions further cause the computer system to perform one of: storing the object by the node identified for servicing the request or retrieving the object from the node identified for servicing the request.

20. The non-transitory computer-readable storage medium of claim 15, wherein the executable instructions further cause the computer system to identify a failover node for servicing the request.

* * * * *